(12) United States Patent
Guanter et al.

(10) Patent No.: US 7,295,526 B2
(45) Date of Patent: Nov. 13, 2007

(54) METHOD OF TRANSMITTING INFORMATION BETWEEN TWO UNITS EACH PROVIDED WITH MEANS FOR SENDING AND/OR RECEIVING SIGNALS

(75) Inventors: Jean-Charles Guanter, Diesse (CH); Ermanno Bernasconi, Neuchâtel (CH); Ming Xu, Montréal (CA)

(73) Assignee: ASULAB S.A., Marin (CH)

( * ) Notice: Subject to any disclaimer, the term of this patent is extended or adjusted under 35 U.S.C. 154(b) by 1009 days.

(21) Appl. No.: 10/391,662

(22) Filed: Mar. 20, 2003

(65) Prior Publication Data

US 2003/0179778 A1    Sep. 25, 2003

(30) Foreign Application Priority Data

Mar. 25, 2002  (CH) .................................... 0516/02

(51) Int. Cl.
*H04B 7/00*      (2006.01)
(52) U.S. Cl. ..................................................... 370/310
(58) Field of Classification Search .................... None
See application file for complete search history.

(56) References Cited

U.S. PATENT DOCUMENTS

| | | | |
|---|---|---|---|
| 4,811,338 A * | 3/1989 | Haruyama et al. .......... 370/462 |
| 5,212,715 A * | 5/1993 | Pickert et al. ............... 375/366 |
| 5,515,426 A * | 5/1996 | Yacenda et al. ........ 379/201.07 |
| 5,801,664 A | 9/1998 | Seidensticker et al. |
| 5,910,945 A * | 6/1999 | Garrison et al. ............ 370/324 |
| 5,943,376 A | 8/1999 | Proctor et al. |
| 6,842,438 B1 * | 1/2005 | Benedict et al. ............ 370/328 |
| 2001/0038650 A1 | 11/2001 | Park et al. |

FOREIGN PATENT DOCUMENTS

EP             957589 A1    11/1999

* cited by examiner

*Primary Examiner*—Edan Orgad
*Assistant Examiner*—Blanche Wong
(74) *Attorney, Agent, or Firm*—Sughrue Mion, PLLC

(57) ABSTRACT

The method is one of wireless transmission of information between two units consisting primarily of a portable object, such as a personalized watch (1), and a computer station (20). Each unit includes signal transmitting and/or receiving means (2, 24, 26) switched alternately to a transmitting mode and into a receiving mode. Information is transmitted by transmitting a plurality of information frames alternately between the two units. Each information frame comprises a synchronization field, which includes a particular number of synchronization bytes, an information packet and filler bytes. On receiving a frame, the receiving unit counts the synchronization bytes. The receiving unit transmits, in a heading of the information packet, a synchronization indication which is a function of the number of synchronization bytes received. The synchronization indication is used to correct the size of the synchronization field of the next frame received by the receiving unit. These synchronization field size correction operations are effected in a similar manner in both units.

9 Claims, 9 Drawing Sheets

METHOD OF TRANSMITTING INFORMATION BETWEEN TWO UNITS EACH PROVIDED WITH MEANS FOR SENDING AND/OR RECEIVING SIGNALS

BACKGROUND OF THE INVENTION

The present invention relates to a method of transmitting information between at least two units consisting of two computer stations or two personalised portable objects or one personalised portable object and one computer station. The portable object is a personalised watch, for example. For implementing the method, the portable object, for example the watch, and the computer station each comprise means for transmitting and/or receiving signals which are activated alternately in a transmitting mode and a receiving mode. The signals transmitted, which are preferably short-range radio-frequency signals, include at least one information frame modulated onto a carrier chosen from a plurality of available carriers in the computer station and/or in the watch. The information in the frame relates, for example, to data to be stored in a memory of the watch or to data to be transmitted from the memory to the computer station. The information can also concern commands to execute operations or requests to identify the transmitting source.

The data from the memory or the data to be stored in the memory is preferably data of a diary function. When the diary function is active, it is possible to consult data records previously stored by activating keys of the watch in various menus. The various menus of the diary function relate to notes, an address book, a diary, transmission of data by radio-frequency signals and parameters. One menu of the diary function concerns a data transmission mode. In the selected transmission mode, data from the memory of the watch is transmitted to the computer station or data is received from the computer station. When this menu is selected, it is in principle no longer possible to use other diary functions of the watch until the transmission phase has terminated.

The transfer of data between a computer station and an electronic watch by means of short-range radio-frequency signals is already known in the art. For example, European Patent Application EP 0 957 589 in the name of the Applicant describes a communication system linking first and second units. The units each include means for transmitting and/or receiving short-range radio-frequency signals for bi-directional transmission of data. The first unit is preferably a personalised electronic watch and the second unit is a computer station. The electronic watch with its means for transmitting and/or receiving signals must be within a particular coverage area of the computer station for data to be exchanged.

Once communication has been established from the computer station, the transmitting and/or receiving means of the watch must be active at least during each period of transmitting and/or receiving radio-frequency signals.

The data transferred is preferably data of a diary function. The data is transferred in the form of packets of information each contained in an information frame modulated onto a high-frequency carrier. The size of each packet transmitted depends on the size of a non-volatile memory page in the watch. A plurality of information frames must therefore be transmitted to transfer all of the information.

In the above patent application, a plurality of computer stations can each communicate with a respective personalised watch in the same coverage area. To this end, the transmission of data signals between each station and a respective personalised watch uses a high-frequency carrier different from the carriers for transmission between the other stations and the other personalised watches. The carrier onto which the data signals are modulated is chosen in the computer station, for example, as a function of an anti-collision protocol that is well-known in the art, so as not to interfere with the transmission of data signals between other stations and other watches.

In the application EP 0 957 589, there is no provision for limiting the power consumption of the watch during bidirectional transmission of diary function data, which is a major drawback. As the electronic watch is a small instrument supplied with power by a low-power source of energy, it is necessary to optimise the transmission time of all the necessary data between the computer station and the watch. This optimisation must limit the time of operation of the transmitting and/or receiving means of the watch, which consume a large amount of energy.

SUMMARY OF THE INVENTION

One object of the invention is to overcome the drawbacks of the prior art by proposing a method of wireless information transmission between two units, such as an electronic watch and a computer station, which reduces the time to transmit all of the data. The time for which the transmitting and/or receiving means are activated is also reduced, in particular for at least one of the units, such as the watch. This reduction in the transmission time is dependent on transmission quality and the status of the power supply of each unit. Thus it must be possible to vary dynamically the size of parts of each information frame as a function of transmission quality.

To this end, the invention provides a method as cited hereinabove of wireless transmission of information between at least two units consisting of two computer stations or two personalised portable objects or a personalised portable object and a computer station, which method is characterised in that it includes the following steps:

transmitting from one unit to the other unit an information frame modulated onto the selected carrier and including a synchronisation field, which consists of a particular number of bytes of identical value, and an information packet;

counting bytes in the synchronisation field of the received frame, and comparing the number of bytes counted with a particular threshold number to transmit an indication for correcting the number of bytes in the synchronisation field of the next frame to be received.

An advantage of the information transmission method according to the invention is that it saves time in transmitting information between a first unit and a second unit by dynamically varying the size of the synchronisation field. The transmission of all data is monitored, minimising transmission errors. The protocol used must therefore enable transmission of maximum information in minimum time. If transmission quality is good, the size of the synchronisation field can be reduced to a minimum, whereas if transmission quality is degraded, the size of the synchronisation field is adapted so that all the data can be transferred without difficulty from one unit to the other.

If the size of the synchronisation field did not vary, it would have to be sufficiently large to guarantee transmission of the information in the most critical circumstances. This fixed size would penalise the time to transmit information between the two units.

As one of the units is preferably a personalised electronic watch, the size of the synchronisation field depends on the time taken to switch between the modes of transmitting and receiving radio-frequency signals by the watch, for example. What is more, the switching time depends on the voltage of the battery supplying power to the electronic components of the watch. It is obvious that as this voltage falls, the size of the synchronisation field must be increased.

Before information is taken from each frame, each unit must count at least a minimum number of synchronisation bytes, for example at least three synchronisation bytes, of identical value, and two further bytes of the same value as a security measure. The bytes of the received synchronisation field are counted when the unit has locked onto a selected high-frequency carrier for the radio-frequency signals.

In a preferred embodiment, the unit consisting of the computer station can increase or reduce the size of the data transferred to the portable object, for example the watch. This size is preferably defined by the size of the data pages to be stored in a non-volatile memory of the watch, for example 64 bytes. If a transmission error has been detected, it is necessary to repeat the transmission of the information frame that has not been received. Thus the greater the number of transmission errors detected by the station, the greater the time to transmit all the data. Because of this, the size of the data to be transferred can be adjusted in the computer station to alleviate these errors. An optimum as a function of transmission quality must be found.

In a preferred embodiment, the computer station transmits data frames formatted to allow storage of the data in the non-volatile memory of the portable object, for example the watch. Memory read and write addresses are transferred in the information frames from the computer station. This avoids having to look up memory addresses for reading or writing data when information frames are received in the data management unit of the watch. This saves time reading or writing the memory.

BRIEF DESCRIPTION OF THE DRAWINGS

The objects, advantages and features of the above method of wireless transmission of information between two units will become more clearly apparent in the course of the following non-limiting description, which is given with reference to the accompanying drawings, in which.

DESCRIPTION OF A PREFERRED EMBODIMENT

The following description relates to a method of wireless transmission of information between two units each of which has means for transmitting and/or receiving signals. The signals are short-range radio-frequency signals, for example. The units preferably comprise a computer station and an electronic watch. However, it is equally possible to envisage the transmission of information by the method according to the invention between two computer stations or two portable objects, such as two watches.

As the method according to the invention can transmit multiple types of information, the remainder of the description refers mainly to the transmission of information relating to a diary function between an electronic watch and a computer station, such as the transmission of data relating to the diary function menus, such as notes, addresses, diary data and parameters.

Figure 1:
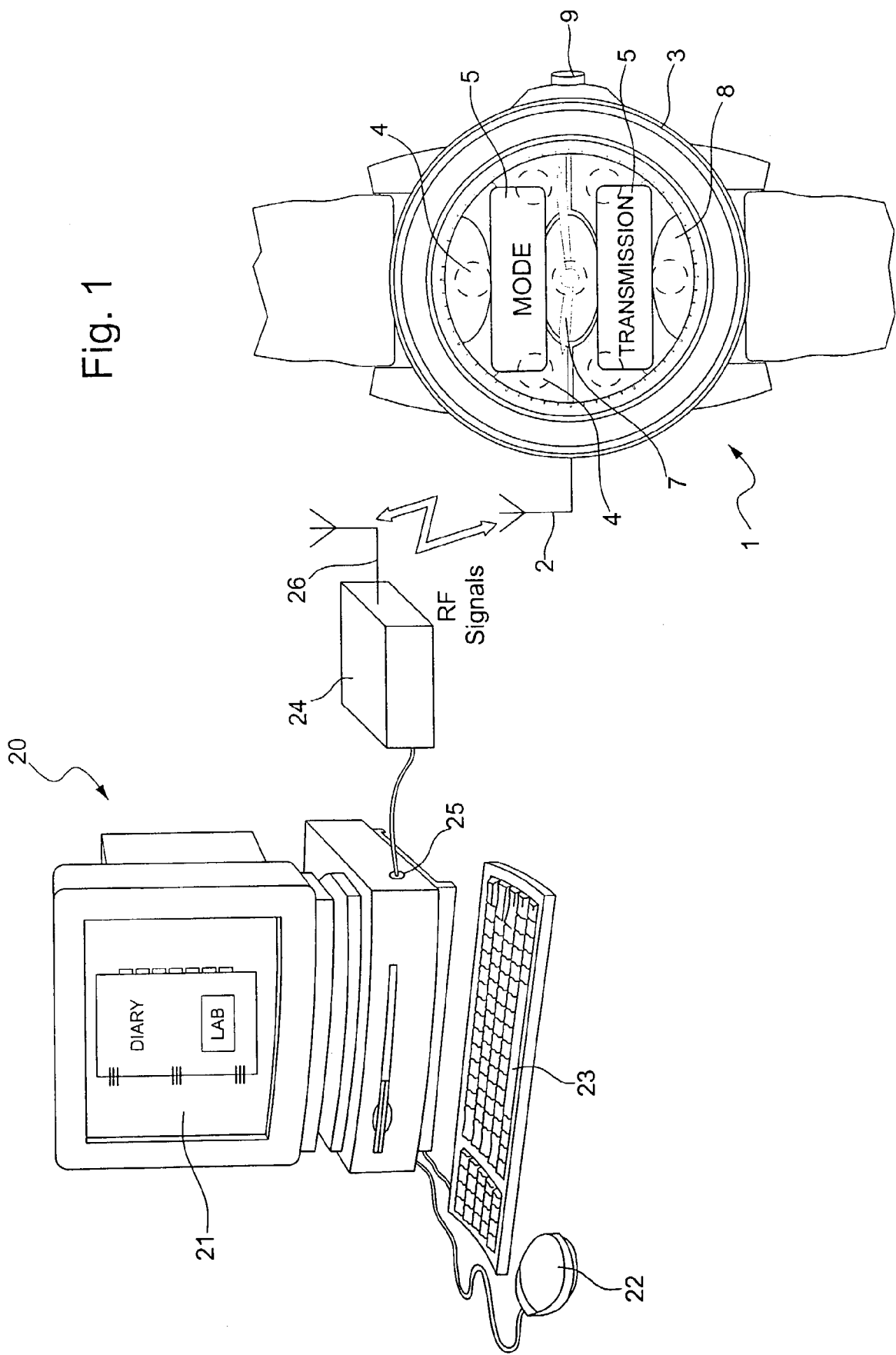
FIG. 1 shows an installation comprising a computer station and a personalised watch for implementing the method according to the invention of wireless transmission of information.

In the example shown in FIG. 1, the installation for implementing the method of wireless transmission of information comprises two units consisting of an electronic diary watch 1 and a computer station 20. The computer station 20 essentially comprises a keyboard 23, a mouse 22 and a screen 21 on which all diary function data can be displayed. To facilitate its use, the personalised diary that appears on the screen 21 of the computer station can be a replica of a traditional desk diary. In principle it is opened as soon as a personal password has been entered. The pages of the diary can be turned on the screen using the keyboard 23 or the mouse 22 to move a pointer designating a cursor or a tab on the edge of the diary. As soon as a type of diary page has been selected, for example by means of the corresponding tab, the diary is opened on the screen at the corresponding page to show in particular all of the fields stored in memory. Each message field can comprise up to 63 alphanumeric characters, for example.

The computer station 20 further includes a peripheral unit 24 connected by a USB or other type cable 25 to an input of the computer station. The unit 24 includes means for transmitting and/or receiving short-range radio-frequency signals from and/or to the computer station 20 via an antenna 26. It is obvious that in a different embodiment the transmitting and/or receiving means of the computer station could equally well be integrated into the main part of said station. The watch 1 also includes means for transmitting and/or receiving short-range radio-frequency signals via an antenna 2 for the bi-directional transmission of information within a coverage area of the computer station. The two units with their transmitting and/or receiving means implement the method in accordance with the invention of transmitting information explained hereinafter with reference to FIGS. 3 to 11.

In the embodiment shown in FIG. 1, the wristwatch 1 is an analogue watch with a dial 8, hands 7 indicating the time, a clock movement in a casing 3 under the dial 8, two liquid crystal matrix displays 5 for displaying in particular diary function information, control keys 4 on the interior face of the glass, and a control button 9 on the casing. A battery, not shown, in the casing 3 supplies electrical power to the electronic components of the watch. The control keys 4 are preferably capacitive sensors which can each be activated individually by a finger of a user placed in a particular area of the sensor to be activated. However, it is obvious that a watch with a digital time display and control buttons on the casing for activating various functions of the watch could also be envisaged.

Figure 2:
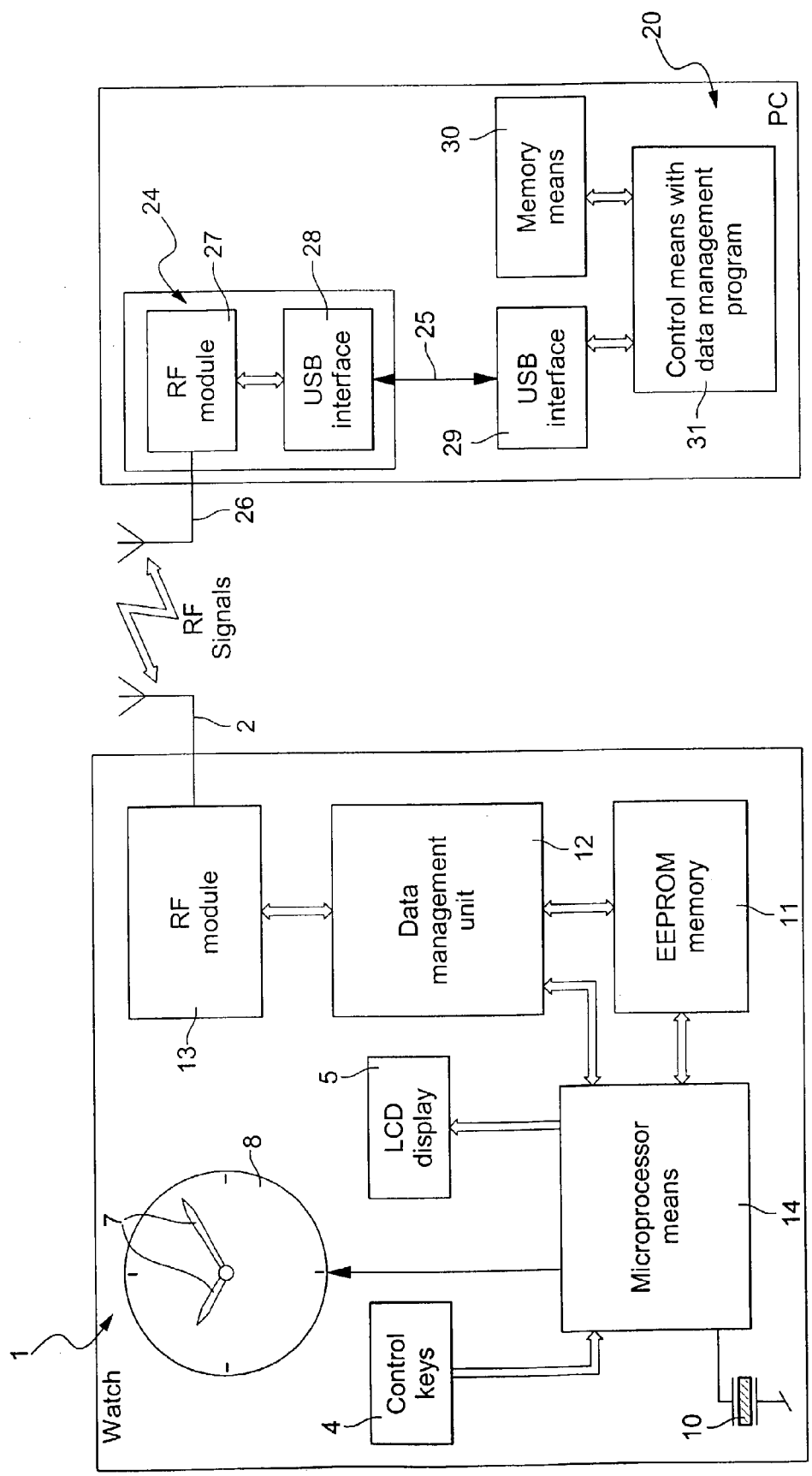
FIG. 2 shows diagrammatically various electronic units of the FIG. 1 information transmission installation in accordance with the invention.

FIG. 2 shows diagrammatically various components of the personalised watch 1 and the computer station 20 for implementing the method in accordance with the invention of bi-directional transmission of information. The watch 1 includes microprocessor means 14 programmed to manage the diary function in the watch. The microprocessor means 14 also include modules connected to the timebase controlling the display of the time by the hands 7 on the dial 8 of the watch. An oscillator stage connected to a quartz crystal 10 is included in the microprocessor means 14 to time various operations of the watch. The oscillation frequency is of the order of 32.768 kHz.

The microprocessor of said means 14 can be an 8-bit PUNCH microprocessor manufactured by the Swiss company EM Microelectronic-Marin SA, for example. Once the diary function has been activated, in particular by pressing the control button, the control keys 4 can be operated to input signals to the microprocessor means 14. The signals from the keys 4 relate in particular to selecting the menus of the diary function and editing data to be stored in the non-volatile EEPROM 11. If the transmission mode has not been activated by one of the keys 4, it is possible to view all of the stored or edited data or parameters on the liquid crystal display or displays 5.

The microprocessor means 14 are connected to a data management unit 12 which, in conjunction with the transmitting and/or receiving means, manages all transfer or reception operations of information to or from the computer station. The transmitting and/or receiving means of the watch 1 consist of the RF module 13 and the antenna 2 and are not explained in detail because they form part of the general background knowledge of the person skilled in this particular art.

When the transmission mode is selected the data management unit 12 blocks the other diary functions of the watch and, independently of the microprocessor means 14, the management unit can read the non-volatile memory 11 directly or write received data directly into the memory. The management unit 12 is timed by clock signals from the clock oscillator. It is therefore advantageous to use the frequency of the clock oscillator to modulate the information onto a selected high-frequency carrier for bi-directional transmission of information (at a data rate of 32 768 bauds).

For transmitting information relating in particular to a diary function, the computer station 20 includes control means 31 connected to memory means 30 and running a data management program. The control means 31 enable all operations carried out by means of the mouse or the keyboard to be viewed on the screen of the station 20. The computer station 20 also includes a peripheral unit 24 which includes the means for transmitting and/or receiving radio-frequency signals, which essentially consist of a RF module 27 and an antenna 26. For converting signals coming from the means 31 or the RF module 27, a USB interface 29 in the main part of the computer station 20 and another USB interface 28 in the peripheral unit are connected by a cable 25.

To establish communication with a personalised watch 1, the computer station 20 selects at least one of the five available channels, normally that subject to the least interference. The watch must be in a coverage area of the computer station and a transmission mode of the watch must be selected to respond to the personalised call. Of course, the watch responds to the computer station only when it has been able to lock onto the transmission channel selected by the station and in particular has succeeded in recognising its identification number (see below).

Each transmission channel corresponds to a particular high-frequency carrier at a frequency of around 434 MHz, for example. For bi-directional transmission of data synchronisation signals must be modulated onto the selected carrier. This task is managed by the computer station to spare the watch various tasks that are costly in terms of power consumption.

The advantages of the transmission method according to the invention are explained in more detail hereinafter with reference to FIGS. 3 to 11. The transmitting and/or receiving means in each unit are switched alternately to transmitting mode and receiving mode. Information frames modulated onto a selected carrier are therefore transmitted alternately from each unit, as explained hereinafter with reference firstly to FIGS. 3 and 4.

Because the watch includes a non-volatile EEPROM, data from the memory is transmitted or received in memory page units whose size is fixed by default at 64 bytes in each information frame. However, the size of the data to be transmitted can be set at 32, 64, 128 or 256 bytes, in particular by the computer station. Because of this, the transmitting and/or receiving means of each unit must be switched alternately to a transmitting mode and a receiving mode until all the information has been transmitted. Of course, it is advantageous to transmit information frames with the largest possible data size, but an optimum size must be found to avoid having to retransmit the frame if an error is detected in the receiving unit.

Initially, the computer station must attempt to contact the personalised watch with which it wishes to communicate. To this end, the computer station selects a transmission channel from the five transmission channels currently available. The information modulated onto the selected carrier includes synchronisation information necessary for recognition of the data transmitted by the transmission method according to the invention.

During this first phase of establishing contact, the computer station transmits a long series of synchronisation bytes with the same value, which can have a duration of the order of 2.7 seconds. The synchronisation bytes preferably have a value of 81 in hexadecimal, which is 10000001 in binary, in particular so as not to confuse this value with noise. Moreover, this makes it possible to find the beginning of a synchronisation byte. As the frequency of the information modulated onto the carrier is of the order of 32.768 kHz, there are more than 11 000 synchronisation bytes with the same value. The synchronisation time $t_L$ must allow time for the watch contacted to scan the five transmission channels to locate the transmission channel selected by the computer station. Moreover, the time $t_L$ also takes account of a rest period of the transmitting and/or receiving means of the watch, intended to save power, which may be set at 2.5 seconds. To locate the transmission channel, the watch must be able to count synchronisation bytes when scanning each of the five currently available transmission channels.

Figure 3:
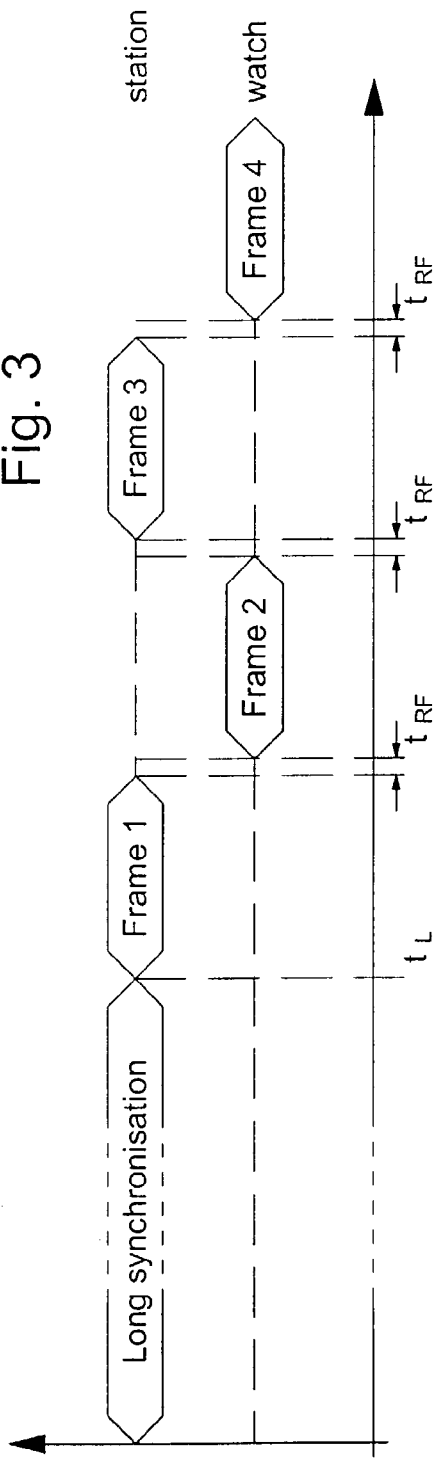
FIG. 3 shows a timing diagram of information frames transmitted between the computer station and the personalised watch in a transmission method according to the invention.
Figure 4:
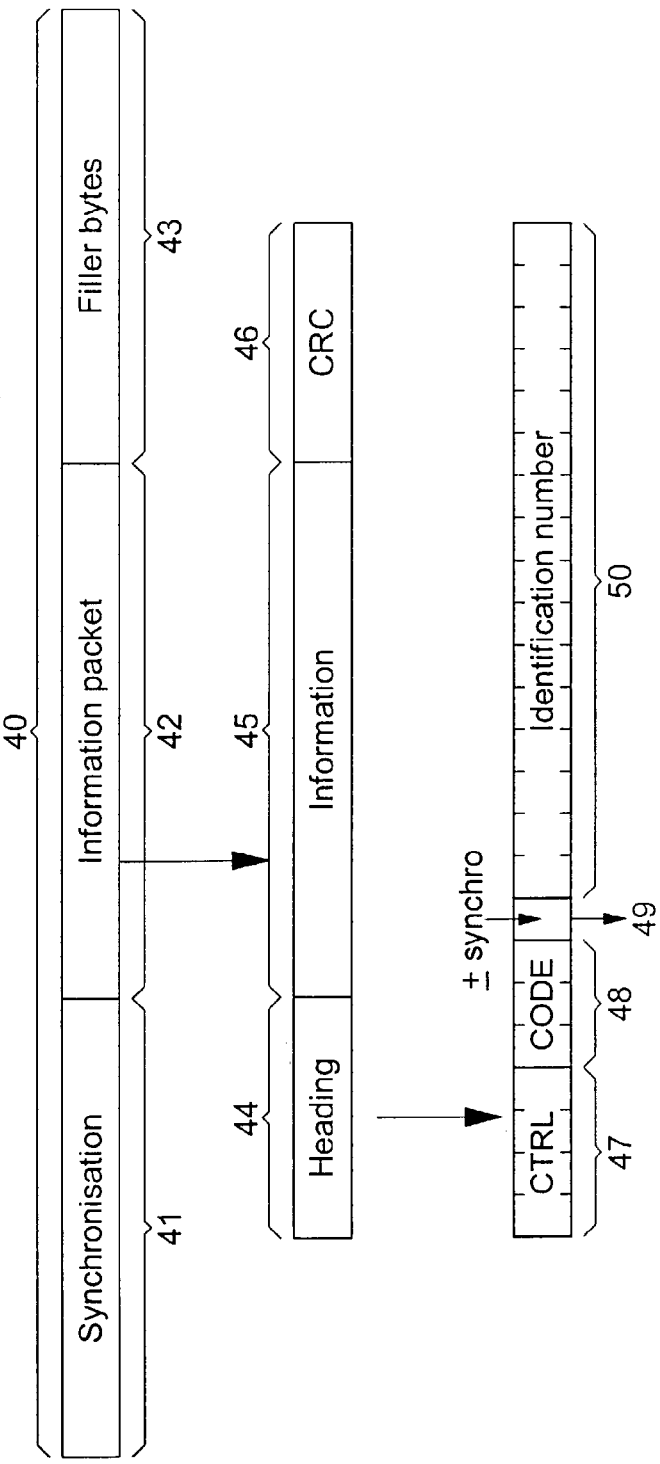
FIG. 4 shows an information frame modulated onto a high-frequency carrier of radio-frequency signals in the transmission method according to the invention.

As shown in FIG. 3, in the transmitting mode of the computer station, the long series of synchronisation bytes is followed directly by a first information frame 40 which includes a synchronisation field 41 of varying size, an information packet 42 and at least two filler bytes 43. The filler bytes are used mainly for switching the transmitting and/or receiving means between the transmitting mode and the receiving mode. The value of the filler bytes can be set at 00 in hexadecimal to avoid conflict with the data in the information packet 42 and with the synchronisation bytes.

If the watch is able to lock onto the transmission channel selected by the computer station during the long series of synchronisation bytes or the synchronisation field of the first frame, it responds to the computer station by means of a second information frame, after switching its transmitting and/or receiving means. The alternated transmission of information frames between the two units continues in this way until all the information has been transferred. It may take a few minutes to transmit all the information, depending on the quantity of data to be transmitted, for example.

In the worst case scenario for switching from the transmitting mode to the receiving mode in each unit, the time $t_{RF}$ for switching the transmitting and/or receiving means is less than 20 ms. Switching in the watch is relatively slow compared to switching in the computer station, as the watch is battery-powered, whereas the computer station is connected to the main electrical power supply. The switching speed therefore depends on the electrical power supply.

Note that the computer station transmits the long series of synchronisation bytes followed by the first frame a number of times, until the user reacts and switches his watch to the transmitting mode to respond to the first frame received. The gap between each repetition of the long series of synchronisation bytes and the first frame is of the order of 130 ms. A maximum waiting time for a response from the watch can be set at 45 seconds, for example.

One advantage of the method according to the invention is being able to vary dynamically the size of the synchronisation field 41, which depends in particular on the RF switching speed and transmission quality. To this end, on reception of the information frame 40, the number of synchronisation bytes is counted, for example by a counter in the data management unit of the watch or in the management program of the control means of the computer station. It is necessary to be able to count at least three synchronisation bytes in each frame as well as two further security bytes. If the number of synchronisation bytes counted is greater than the minimum of five synchronisation bytes, an indication is transmitted to the transmitter to reduce the size of the synchronisation field by at least one byte. On the other hand, if the number of bytes counted is less than the minimum of five synchronisation bytes, an indication is transmitted to the transmitter to increase the size of the synchronisation field by at least one byte, preferably by three bytes. The same applies if no response is received, which may signify that the series of synchronisation bytes is too short.

Note that at the beginning of the attempt to establish contact between the computer station and the watch, the number of bytes in the synchronisation field 41 of the information frames 40 can be set at 25 bytes, for example, as a security measure.

The indication to vary the synchronisation field size is placed in a heading 44 of the information packet 42 of each information frame 40. That information packet 42 includes, after the heading 44, a payload information field 45 and a cyclic redundancy check (CRC) field 46. The CRC code, which is well-known in the art, is used primarily to check for transmission errors in the preceding information. If an error occurs, the transmitting unit must transmit the information frame to the receiving unit again.

In the heading 44, consisting of three bytes, the first byte comprises four control bits 47, three code bits 48 concerning the type of information transmitted, and an indication 49 relating to the size of the synchronisation field 41 received. The last two bytes of the heading concern the last two bytes of the identification number of the watch. Note that the four control bits 47 must have the opposite value to the three code bits 48 and the indication 49 for no error to be detected. The indication 49 takes the value 1 if the received synchronisation field 41 is too small or 0 if the received synchronisation field 41 is too large.

If the computer station does not know the identification number of a personalised watch, the first frame transmitted by said station comprises a generic number, for example 0000 in hexadecimal. When the watch has locked onto the transmission channel selected by the computer station, it transmits a frame with its identification number to the computer station. Thus the identification number of a new personalised watch can be stored in memory in the computer station. The anti-collision principle is used, as indicated above for the situation in which a plurality of computer stations are each attempting to communicate with a corresponding personalised watch in the same coverage area. Accordingly, each watch responds to one of the stations only if it has recognised its own identification number. The selected transmission channels of each combination of a computer station and a watch are different to prevent information transfer problems.

The various types of information code 48 transmitted from one unit to the other unit are defined in the tables below. The first table I relates to the information codes transmitted from the computer station to the watch and the second table II relates to the information codes transmitted from the watch to the computer station.

TABLE I

| Code | Name | Description |
| --- | --- | --- |
| 1 0 0 | UPLOAD | Data transfer to watch |
| 1 0 1 | DOWNLOAD | Transfer request from watch |
| 1 1 0 | CONTINUE READ | Further data request from watch |
| 1 1 1 | ID NUMBER | ID number request from watch |
| 1 1 1 | DATA LENGTH | Number of data items per data field |
| 0 0 0 | END | End of transmission |

TABLE II

| Code | Name | Description |
| --- | --- | --- |
| 0 0 1 | DATA DOWNLOAD | Data transfer to station |
| 1 0 1 | ACKNOWLEDGE | Confirm of correct reception |
| 1 1 0 | NO ACKNOWLEDGE | Announcement incorrect reception |
| 1 1 1 | ID NUMBER | Return of watch ID number |
| 0 0 0 | END | End of transmission |

When communication is established between the computer station and the personalised electronic watch, all the information frames include a heading in which the code specifies the type of information to be transmitted, as defined in the above tables. In particular, the type of data transfer can be selected or programmed in the computer station, and can be a transfer from the station to the watch with synchronisation (read/write), transfer from the watch to the station with synchronisation (read) or an overwriting transfer from the station to the watch (write).

As it is the computer station that manages the operations relating to the transfer of data from the non-volatile memory of the watch, the station transmits the memory addresses directly to the watch in the radio-frequency signals. Thus when said radio-frequency signals are received in the watch, the memory addresses can point directly to specific memory locations via the data management unit of the watch. The operations to be carried out in the watch are simplified by formatting the memory addresses to be transmitted on the radio-frequency signals from the computer station for reading or writing data in the memory of the watch, which reduces power consumption from the battery of said watch. This data can be processed in the data management unit at a frequency below 40 kHz. Previously, it was necessary to have a more complex management unit clocked at a frequency of the order of 512 kHz to process the signals received without information relating to the memory addresses.

In the first steps of the information transmission method, data concerning page 0 of the static zone of the EEPROM is transmitted. In this way, the computer station can determine in particular the location of the last data item of the dynamic zone of said watch and various parameters. The pointer of the empty area stored in the static zone of the memory defines an effective number of data pages of the memory to be transmitted.

Once the various parameters stored in the memory of the watch have been obtained, in particular in this page 0, it is possible to read data from the memory, for example. In this case, the computer station transmits a frame 40 in which the code 101 (DOWNLOAD) is specified. After this heading, the information packet 42 includes a write address field of three bytes, a read instruction field of one byte, and a CRC field. The watch responds by transmitting, after switching the transmitting and/or receiving means of the watch, an information of the downloading of data to the computer station by means of the code 001 (DATA DOWNLOAD) in the heading 44 of the packet 42 of the response frame 40. After the response heading, the information packet includes an information field giving the number of data items transmitted and a CRC field.

After its read request frame, the computer station transmits a frame with a heading 44 containing the code 110 (CONTINUE READ) requesting to continue to read. In this case, only the read instruction is transmitted to the watch to continue reading memory data, because the watch increments its internal pointer without reference to the concept of pages. As long as no problem occurs during transfer, the watch transmits response frames with the code 001 in the heading.

At the end of the transfer of information, an information frame with the end of transmission code 000 (END) is transmitted from the computer station to the watch and confirmed by the watch to the computer station. From this time, the transmitting and/or receiving means of the watch are turned off and the other diary functions can be used again.

In the case of writing the memory with data from the computer station, the initial information frame transmitted by the computer station includes the code 100 (UPLOAD) for loading data into the watch. During writing the memory with data from the computer station, the watch transmits to the computer station either an information frame 40 with the code 010 (ACKNOWLEDGE) if the transmission has been received correctly or an information frame 40 with the code 011 (NO ACKNOWLEDGE) if an error occurred during transmission. In this latter case, the computer station transmits the same information frame until the watch confirms its reception by transmitting the code 010.

At the end of the transfer of information, as previously described, an end of transmission information frame is transmitted from the computer station to the watch and from the watch to the computer station in order to interrupt the transmitting and/or receiving means of the watch in particular.

If the computer station logs a large number of transmission errors, the size of the data field can be reduced, for example from 64 bytes to 32 bytes, as described above. In this case, the computer station transmits an information frame with the code 111 (DATA LENGTH) to specify to the watch the size of the data field.

Various operations of the method for wireless transmission of information from the computer station to the watch and from the watch to the computer station are described next with reference to FIGS. 5 to 11. In these figures, rectangles depict the execution of a function. Hexagons depict the execution of a function under the supervision of an availability time-delay. Lozenges depict a condition. Rectangles with cut off corners depict messages appearing on a display device, for example. Finally, rectangles with a double line on each of two opposite sides depict the execution of a sub-routine.

Figure 5:
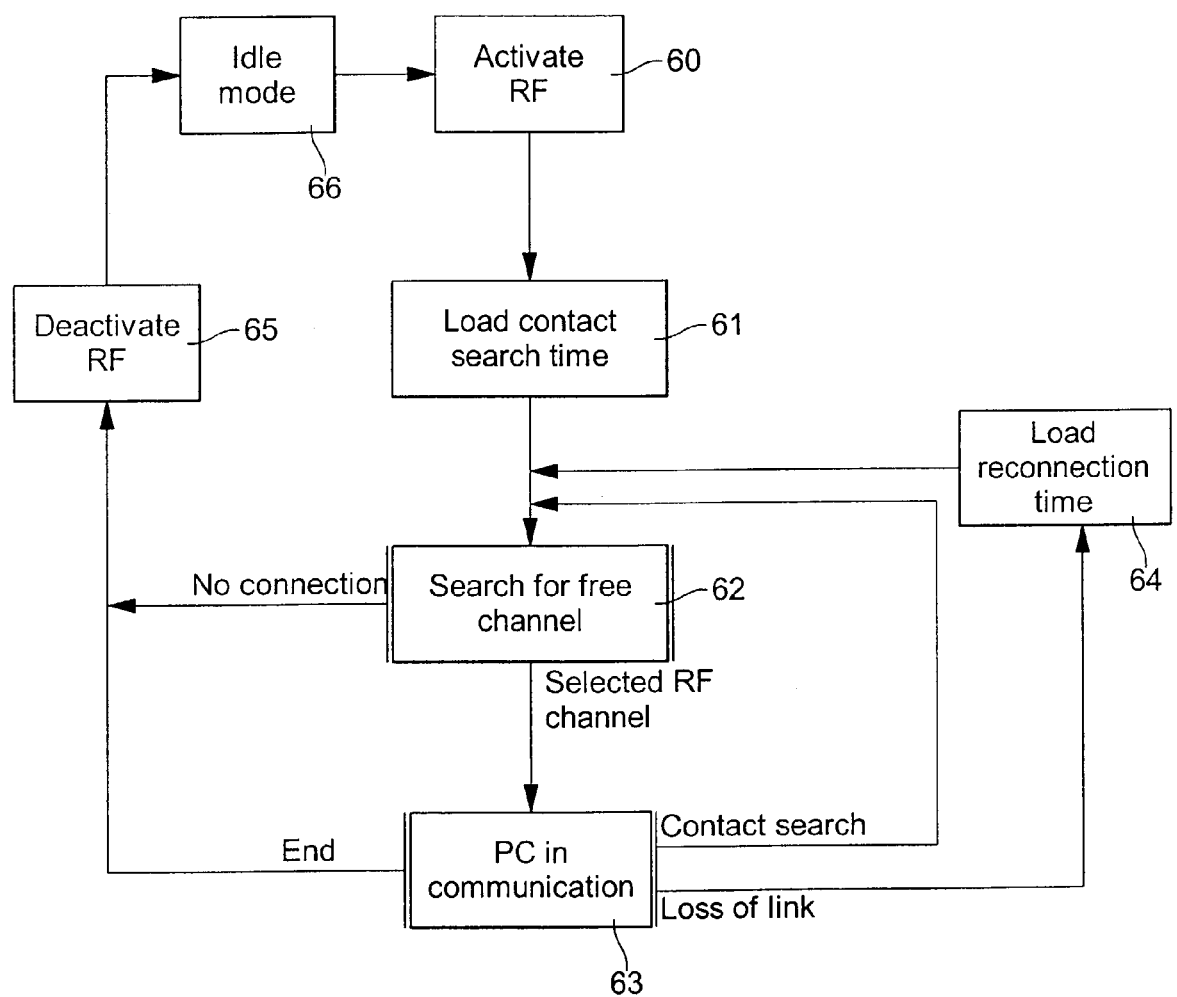
FIG. 5 shows a general flowchart of steps of an information transmission method according to the invention executed in the computer station.

FIG. 5 represents a general flowchart of steps of the method executed in the computer station to transmit information. To establish communication, the transmitting and/or receiving means of the computer station are activated in step 60. After this step 60, a contact search time, for example 45 seconds, is loaded in step 61. A search for a free transmission channel can therefore be conducted immediately in step 62. When a free transmission channel has been selected, the computer station can establish communication in step 63. The watch may not respond to the computer station in step 63. In this case, the contact search is resumed, provided that the specified time (of the order of 45 seconds) has not expired, and a channel search is resumed in step 62.

During communication with the computer station, the connection may be lost momentarily. Contact is re-established in step 64. The time to re-establish contact, which is of the order of 30 seconds, for example, is generally less than the contact search time, because there is no need to allow time for the user to switch his watch to the transmission mode.

When all the information has been exchanged between the computer station and the watch, the computer station transmits an end of transmission frame (END) to the watch and the transmitting and/or receiving means are deactivated in step 65, before returning to an idle mode in step 66.

The "no link" output corresponds to "search time expired", i.e. to the end of the period of 45 seconds or 30 seconds. If no channel is free, the channel with the least interference is used anyway.

Figure 6:
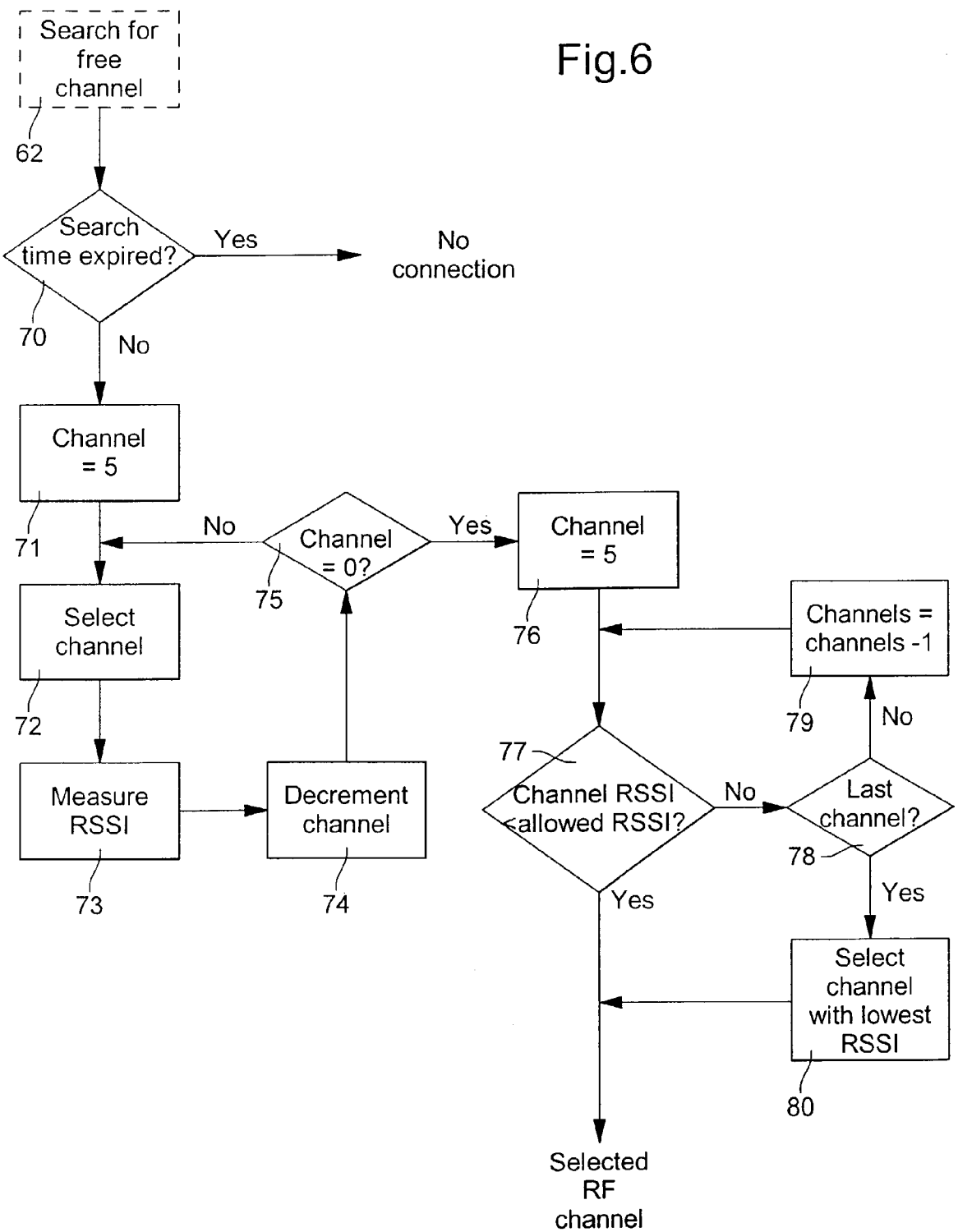
FIG. 6 shows a flowchart of steps of an information transmission method according to the invention executed in the computer station to search for a free carrier or transmission channel.
Figure 7:
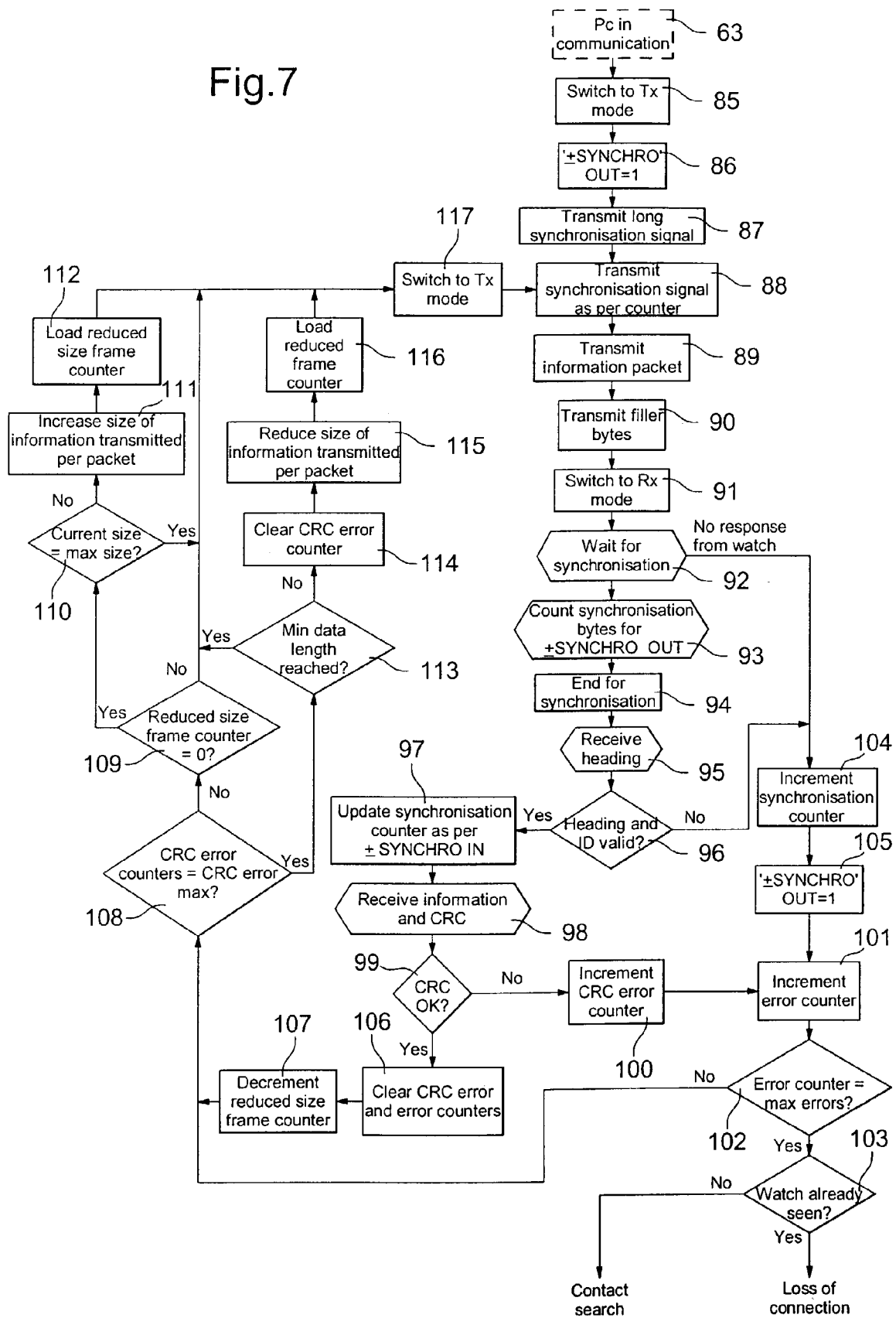
FIG. 7 shows a flowchart of steps of an information transmission method according to the invention for communicating information from the computer station.

FIG. 6 represents the steps of searching for a free transmission channel 62 from the computer station.

Step 70 checks if the search time has expired as a function of a programmed search time, for example 45 seconds. If the search time has expired, there is no link with a personalised watch in the coverage area of the computer station and the transmitting and/or receiving means of the station are deactivated. If the search time has not expired, the number of available channels is set at five in step 71 and a channel is selected in step 72. A received signal strength indicator (RSSI) is measured in step 73 for the selected channel. After measuring the RSSI, the number of the channel to be searched for is decremented by one unit in step 74.

Step 75 checks if the number of channels is equal to zero, which means that all the channels have been searched. If not, the algorithm returns to step 72. If the number of channels when decremented is equal to zero in step 75, the number of channels is restored to five in step 76.

The RSSI measured for the first of the five channels is compared to an allowed RSSI threshold. If the measured RSSI is below the RSSI threshold required for good transmission quality, then the transmission channel is selected for setting up communication with the watch. If not, step 78 checks if this was the last of the five channels whose measured RSSI was compared to the RSSI threshold in step 77. If so, the channel having the lowest RSSI is selected in step 80 for selecting the RF transmission channel. On the other hand, if it is not the last of the five channels, then the channel number is decremented by one unit in step 79. The measured RSSI of the new channel chosen after step 79 is compared to the RSSI threshold in step 77, and the step 77 comparisons are carried out until the last of the five channels has been processed in this way. Note that the order in which the five channels are tested in the search for a transmission channel is random, to prevent all computer stations always selecting the same channel.

Once the transmission channel has been selected for the transmission of information, the computer station enters into the communication mode. Various steps of this mode of communication 63 of the computer station are explained with reference to FIG. 7.

Having selected the transmission channel, the transmitting and/or receiving means of the computer station are switched into the transmitting mode Tx in step 85. An indication of the size of the synchronisation field of the frame to be received in the computer station is set in step 86. At the beginning of the contact search, the computer station transmits a long series of synchronisation bytes in step 87 followed by an information frame. A synchronisation field is transmitted in the information frame in step 88, the number of bytes in which depends on the value of a synchronisation counter, followed by transmitting the information packet in step 89 and filler bytes in step 90.

In step 91, when the filler bytes have been transmitted, the transmitting and/or receiving means of the station are switched to the receiving mode Rx. In step 92, synchronisation of the response frame from a watch is waited for. In step 93, immediately the computer station receives the synchronisation field of the frame transmitted by the watch which is in contact with it, a counter of the station counts the number of bytes in the synchronisation field of the frame received. On completion of the counting of the bytes received in the synchronisation field in step 94, in step 95 the station receives the heading of the frame received from the watch, which includes an indication of correction of the synchronisation field of the next frame to be transmitted from the computer station. If this indication is at 0 the next synchronisation field transmitted by the station must comprise more bytes and if this indication is at 1 the next synchronisation field must comprise fewer bytes. This allows dynamic variation of the synchronisation field, which is one of the advantages of the method according to the invention.

In step 96, a validity check is carried out concerning the heading received with the identification number of the watch that has responded. If the heading received with the identification number is correct, in step 97 the synchronisation counter of the station is updated as a function of the synchronisation indication in the received frame. On the other hand, if the heading received with the identification number is not correct, the next step is step 104, which automatically increments the synchronisation counter of the station. The same applies in step 92 if the watch does not respond during the synchronisation wait time. In step 105, the indication in the heading of the next information packet to be transmitted by the station is set to 1 in order to request a longer synchronisation field for the watch. After step 105, a transmission error counter must be incremented by one unit in step 101.

After the counter is updated in step 97, in step 98 the station receives the payload information from the information packet ending with the CRC code. The CRC code is checked in step 99. If the CRC code is correct, the next step is step 106, which clears a transmission error counter and a CRC error counter. On the other hand, if the CRC code is not correct, then the CRC error counter is incremented by one unit in step 100 and the transmission error counter is incremented by one unit in step 101.

The transmission error counter is checked in step 102. If the number of transmission errors counted is less than a programmed value, for example less than 3, the next step is step 108, which checks the CRC code error counter. On the other hand, if the number of transmission errors counted is greater than the programmed value, the next step is step 103 in which a check relating to the interrogated watch is carried out. If the watch has already been seen during the transmission, the errors in question concern a momentary loss of connection with the watch. On the other hand, if the watch has not yet been seen, the contact search must continue.

After step 106, in which the error counters are cleared, the next step is step 107 for decrementing a counter for counting the number of reduced size data frames to be transmitted. If the size of the data frames to be transmitted is a reduced size, in theory a particular number of reduced size frames is counted, for example 10 frames, before attempting to transmit other larger data frames, for example. After the number of reduced size frames counter has been decremented, the number of errors counted by the CRC error counter is checked in step 108. If the number of errors counted by the CRC error counter is greater than a programmed maximum value, for example greater than 3, the next step is step 113, for checking the length of the transmitted data frames. On the other hand, if the number of errors counted by the CRC error counter is less than the programmed maximum value, the next step is step 109, for checking the counter for the number of reduced size frames transmitted.

In step 109, if the reduced size frame counter indicates 0, this means that the total number of reduced size frames has been transmitted. In this case, the next step is step 110, for checking the current size of the data of the frame. On the other hand, if the reduced size frame counter does not indicate 0, the next step is step 117, for switching the transmitting and/or receiving means to the transmitting mode Tx. The step after step 117 is step 88, for starting the transmitting of a new data frame to the watch.

In step 110, if the current size of the information field, i.e. the data length, is the maximum size, for example 256 bytes, the next step is step 117, for switching the transmitting and/or receiving means of the station to the transmitting mode Tx (see above). On the other hand, if the current size is not yet the maximum size, the size is increased in step 111, after which the reduced size frame counter is loaded in step 112. After step 112, in step 117 the transmitting and/or receiving means of the station are switched to the transmitting mode.

In step 113 the transmitted data length is checked. If the transmitted data length is at a minimum, the next step is step 117, for switching the transmitting and/or receiving means of the station to the transmitting mode (see above). On the other hand, if this length is not at a minimum, the CRC error counter is cleared in step 114, after which the data length of the next frame to be transmitted is reduced in step 115. Finally, in step 116, the reduced size frame counter is loaded before proceeding to step 117 and switching the transmitting and/or receiving means of the station to the transmitting mode (see above).

To summarise, steps 109 to 112 increase the size of the frames if transmission is free of problems and steps 113 to 116 reduce the size of the frames if transmission is disturbed.

Figure 8:
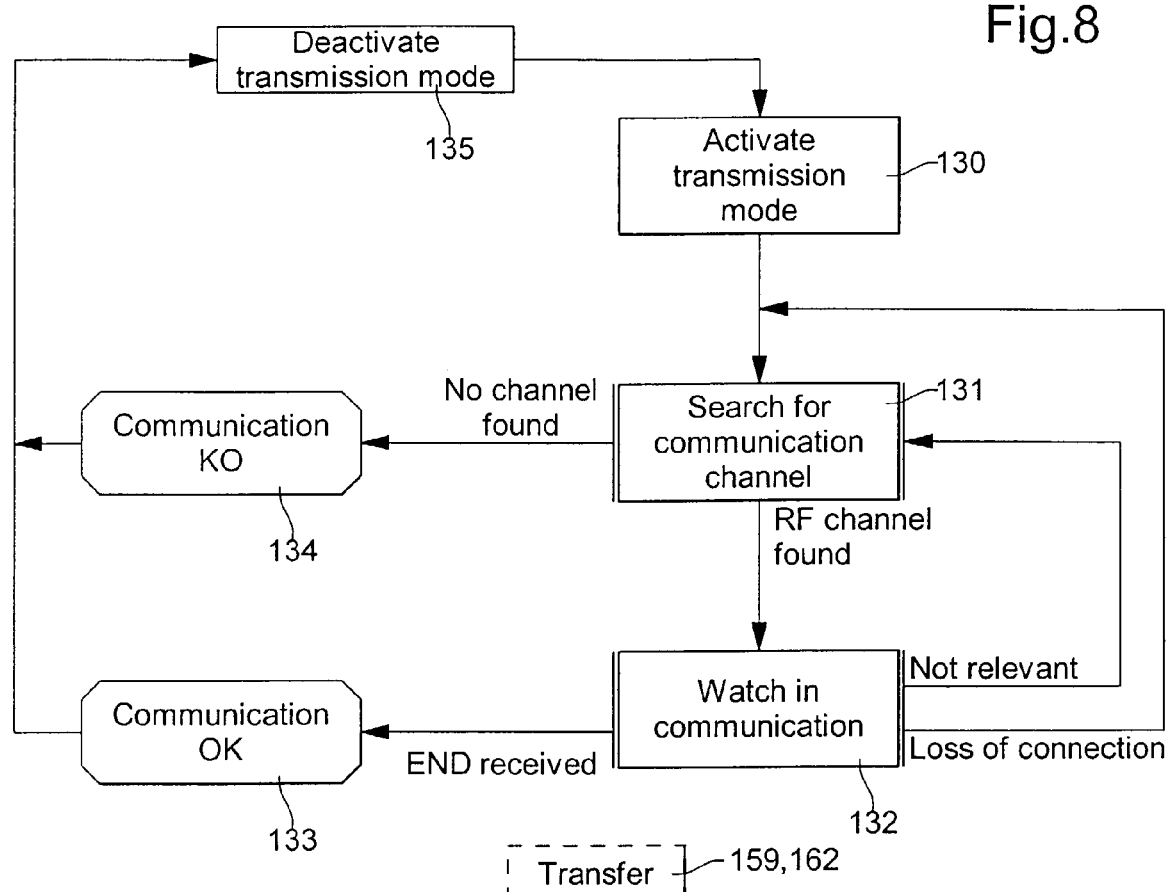
FIG. 8 shows a general flowchart of steps of an information transmission method according to the invention executed in the watch.

FIG. 8 shows a general flowchart of the steps of the transmission method executed in the watch. First of all, when a user wearing his watch is in the coverage area of the computer station, based on the identification number of the watch listed in the station, the station prompts the user to set the watch to the transmission mode for bi-directional transmission of information.

The first step executed by the watch therefore consists of activating the transmission mode of its diary function in step 130. If the transmission mode is activated, the channel is searched for immediately. The pause of 2.5 seconds is applied subsequently only if nothing is found. After entering the transmission mode, in step 131, the watch must search for the transmission channel selected by the computer station as explained below with reference to FIG. 9. If the channel search carried out in step 131 fails after many attempts, for example after a period of 30 seconds, a message is displayed in step 134 indicating that there is no communication with the station. The watch exits the transmission mode in step 135.

Figure 10:
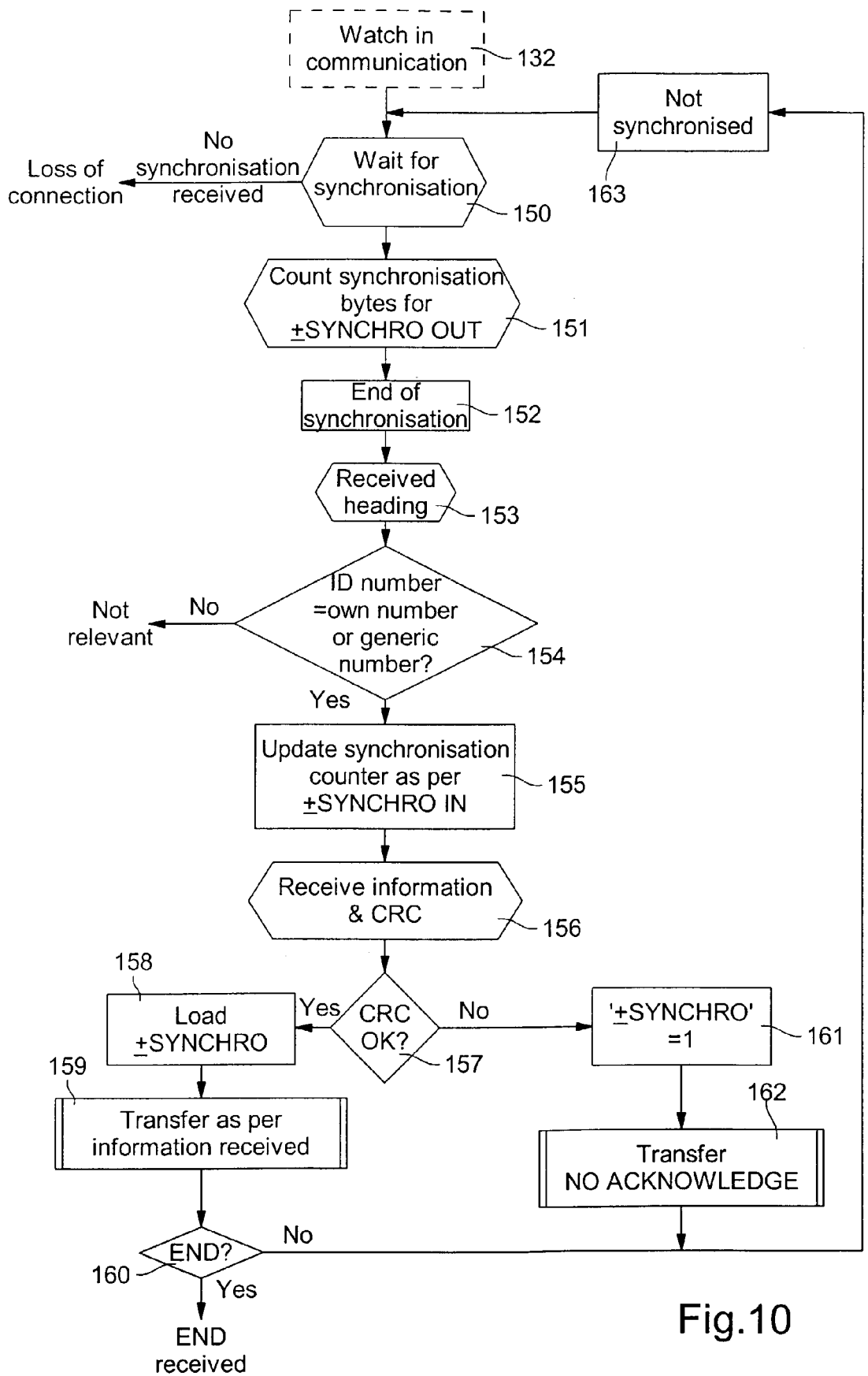
FIG. 10 shows a flowchart of steps of an information transmission method according to the invention for communicating information from the watch.

Once the transmission channel has been found, the watch can communicate with the computer station in step 132, as explained below with reference to FIG. 10. During communication with the computer station, the connection may be lost, for example if the watch is momentarily out of the coverage area of the computer station. In this case, it is necessary to search for the transmission channel again, in step 131. This is also necessary if, in step 32, the identification number on one of the transmission channels selected by the station (selected carrier) does not relate to the watch that is being interrogated. Communication may be in progress between another station and another watch in the same coverage area. Because of this, the watch must be pointed on another transmission channel in step 131.

At the end of transmission of information between the computer station and the watch, both units transmit an end frame. Thus a message indicating that the call has gone correctly is displayed on the watch in step 133, after which the watch exits the transmission mode in step 135.

Figure 9:
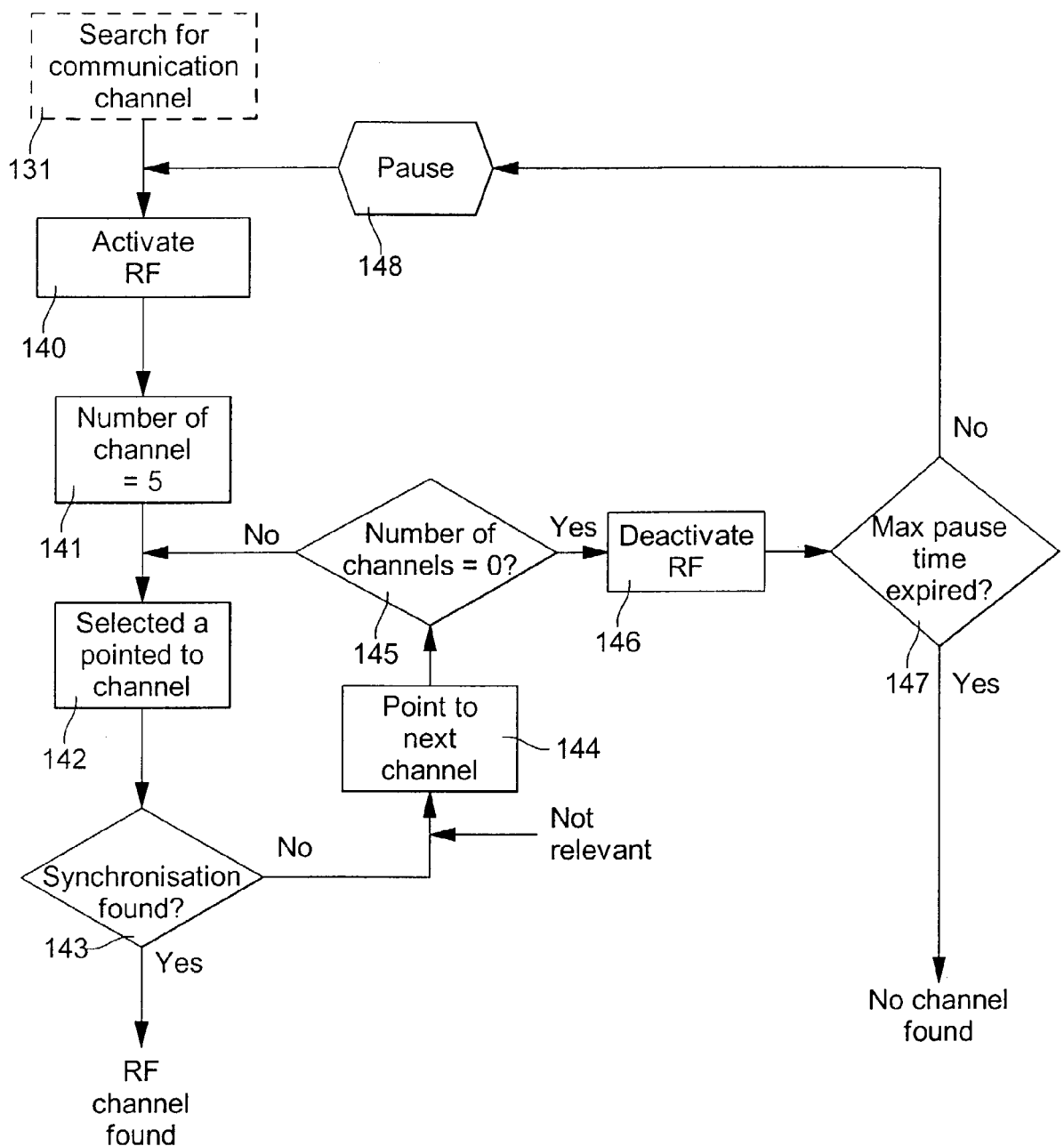
FIG. 9 shows a flowchart of steps of an information transmission method according to the invention executed in the watch to search for the carrier or the transmission channel.

FIG. 9 shows the steps executed in the watch to search for the transmission channel in step 131. To establish communication with the station, the watch must find the channel or carrier that the computer station has selected. In step 140, the transmitting and/or receiving means of the watch are activated. The number of channels is set at five in step 141, and a channel pointed to by the data management unit is selected from the five available channels in step 142. The watch attempts to find the synchronisation frame transmitted by the computer station, as a function of the channel pointed to. If the watch succeeds in counting bytes of the synchronisation field received from the station in step 143, the transmission channel has been found. On the other hand, if the watch does not succeed in counting synchronisation bytes, it is necessary to point to another of the five transmission channels in step 144 and to decrement the number of channels.

In step 145, the number of channels is checked. If the number of channels is not equal to zero, the next step is step 142, for selecting another transmission channel. On the other hand, if the number of channels is equal to zero, all the transmission channels have been selected without finding the correct channel. If no transmission channel is found, the transmitting and/or receiving means of the watch are deactivated in step 146.

In step 147 a check is carried out on the maximum time for which the watch is in the transmission mode without any communication taking place. This maximum time can be set at 30 seconds, for example. If this time has expired, no transmission channel has been found. On the other hand, if this time has not expired, the watch goes to the idle mode in step 148, for example for a period of 2.5 seconds, before activating the transmitting and/or receiving means again in step 140.

Once the watch has been locked onto the transmission channel, it enters into communication in step 132. FIG. 10 shows the steps of communication between the watch and the computer station. Initially, in step 150, the watch is waiting for either the long series of synchronisation bytes from the computer station or a synchronisation field of a first frame transmitted by the computer station. After this, in step 151, a counter in the data management unit of the watch counts the number of bytes in the synchronisation field of the frame received from the computer station. As a function of the result of the synchronisation byte count, a synchronisation indication is transmitted from the watch to the computer station in the heading of the next frame, in order for the station to correct the size of the next synchronisation field it transmits.

At the end of counting the bytes received in the synchronisation field in step 152, in step 153 the watch receives the heading of the frame transmitted by the station. The heading includes an indication of correction of the synchronisation field of the next frame to be transmitted from the watch. If this indication is a 0 the next synchronisation field transmitted by the watch must comprise more bytes and if this indication is a 1 the next synchronisation field must comprise fewer bytes.

This enables dynamic variation of the synchronisation field, which is one advantage of a method according to the invention.

In step 154, an identification number or a generic number received by the watch is checked. If the identification number of a frame transmitted by the computer station corresponds to the identification number of the watch that is being interrogated, the synchronisation counter is updated in step 155. On the other hand, if the identification number does not correspond either to a generic number or to the identification number of the watch that is being interrogated, the watch must not respond. In this case a subsequent transmission channel must be pointed in step 144 (see FIG. 9).

The updating of the synchronisation counter in step 155 is a function of the synchronisation indication in the frame received from the computer station. The state of this indication sets the number of synchronisation bytes of the next frame to be transmitted from the watch. If this indication is a 1 the number of synchronisation bytes is increased and if this indication is a 0 the number of synchronisation bytes is reduced.

In step 156, the watch receives the payload information of the packet of the frame and the CRC code. If in step 157 the watch finds that the CRC code indicates a transmission error, a synchronisation indicaton is set to 1 in a packet heading of the next frame to be transmitted from the watch in step 161. After this, the incorrect reception message is transferred in step 162. The algorithm returns to step 150 (waiting for synchronisation) via a step 163 relating to non-synchronisation of the watch.

If no transmission error is found in step 157, the synchronisation indication is loaded in step 158, after which transfer operations are executed in step 159. In the same way as at the end of complete transmission of the information, each unit transmits an end of transmission frame, and reception of this frame is checked in step 160. If the frame has been received, a similar frame is transmitted to the computer station before deactivating the transmitting and/or receiving means of the watch. Otherwise, the algorithm returns to step 150 (waiting for synchronisation of the next frame from the computer station) via a step 163 for indicating non-synchronisation.

Figure 11:
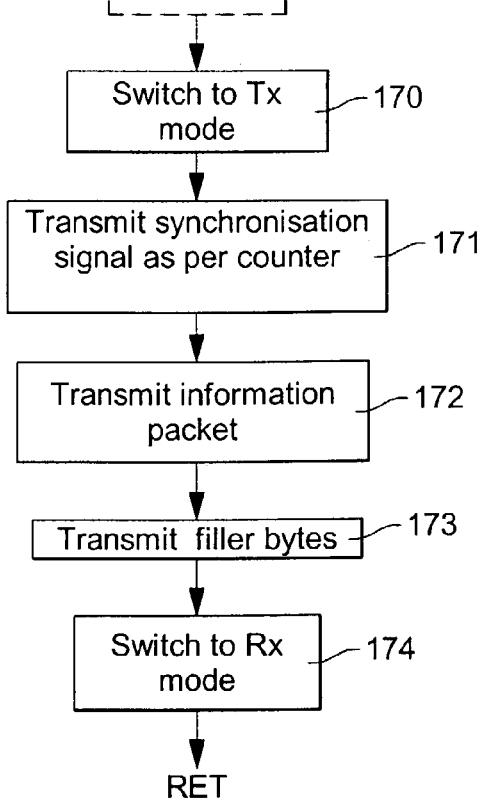
FIG. 11 shows a flowchart of steps of an information transmission method according to the invention for transferring information from the watch.

All transfers of information from the watch to the computer station in steps 159 and 162 are explained with reference to FIG. 11. Initially, in step 170, the transmitting and/or receiving means of the watch must be switched from the receiving mode Rx to the transmitting mode Tx. A synchronisation field of a frame is first transmitted to the computer station, in step 171. The number of bytes in the synchronisation field depends on the updating of the counter in step 155 (FIG. 10) as a function of the synchronisation indication transmitted previously by the computer station. After the synchronisation field, an information packet is transmitted in step 172 in which the heading includes a synchronisation indication for correcting the next synchronisation field transmitted by the computer station. The heading also includes the code of the type of information transmitted, as described above with reference to tables II and II. In step 173, filler bytes are transmitted for switching the transmitting and/or receiving means. Finally, in step 174, the transmitting and/or receiving means are switched from the transmitting mode Tx to the receiving mode Rx for the next frame to be received.

The information transmission method just described assures complete transmission of information in minimum time, for example data stored in or to be stored in a non-volatile memory of the watch. Reducing the information transmission time and the time for preparing the transmitting and/or receiving means of the watch minimises the energy consumed from the battery of the watch during the above information transfer operations. Thus the battery discharges more slowly than in a conventional transmission method, as explained in European Patent Application EP 0 957 589 in the name of the Applicant, which is hereby incorporated herein by way of reference.

Note that the power consumption of the watch is a few thousand times greater when the transmitting and/or receiving means are activated than when they are deactivated. What is more, when the transmitting and/or receiving means are activated, their power consumption is twice as much in transmitting mode as in receiving mode.

Based on the description just given, many variants of the wireless information transmission method can be conceived by the person skilled in the art without departing from the scope of the invention as defined by the claims. Although communication by the method according to the invention may be envisaged between two watches or two computer stations, transmission is preferably between a personalised watch and a computer station. Moreover, the signals transmitted by each unit are preferably short-range radio-frequency signals, but other types of signals, such as light signals or acoustic signals, can be employed in a method according to the invention.

What is claimed is:

1. A method of wireless transmission of information between at least two units consisting of two computer stations or two personalised portable objects or a personalised portable object and a computer station, the portable object and the station each having signal transmitting and/or receiving means for bi-directional transmission of information frames modulated onto a carrier selected from a plurality of available transmission carriers, the transmitting and/or receiving means being switched alternately, when they are activated, to a signal transmitting mode and a signal receiving mode, the portable object including a data management unit connected to the transmitting and/or receiving means to manage received or transmitted information frames and a memory for storing data which is connected to the data management unit, which method includes the following steps:

transmitting from one unit to the other unit an information frame modulated onto the selected carrier and including a synchronisation field, which consists of a particular number of bytes of identical value, and an information packet;

counting bytes in the synchronisation field of the received frame, and comparing the number of bytes counted with a particular threshold number to transmit an indication for correcting the number of bytes in the synchronisation field of the next frame to be received.

2. A method according to claim 1, wherein it includes the steps of:

transmitting from the first unit, when switched to the transmitting mode, to the second unit a first information frame modulated onto the selected carrier and including a synchronisation field, which includes a first number of bytes of identical value in succession, and an information packet;

counting in the second unit, when switched to the receiving mode, synchronisation bytes received in the first frame;

comparing in the first unit the counted number of synchronisation bytes in the first frame with a particular threshold number;

transmitting from the second unit, when switched to the transmitting mode, to the first unit a second information frame modulated onto the selected carrier and including a synchronisation field, which includes a second number of bytes of identical value in succession, and an information packet including a heading which includes a synchronisation correction indication depending on the comparison of the counted number of synchronisation bytes in the first frame with the particular threshold number, and correcting in the first unit, when switched to the receiving mode, the first number of synchronisation bytes by adding or subtracting at least one synchronisation byte as a function of the correction indication received in the second frame in order to transmit a third information frame including a synchronisation field including a third number of bytes of identical value in succession, the third number of bytes being different from the first number of bytes.

3. A method according to claim 2, wherein the information packet in the first frame transmitted by the first unit includes, in a heading of the packet of the first frame, another synchronisation correction indication depending on the comparison of a counted number of synchronisation bytes in a preceding received frame, which was transmitted by the second unit, with another particular threshold number, in order to correct the second number of synchronisation bytes by adding or subtracting at least one synchronisation byte as a function of the correction indication transmitted in the first frame.

4. A method according to claim 1, for which the first unit is a computer station and the second unit is a personalised watch, wherein, in a first interrogation phase conducted between the computer station and the personalised watch located in a coverage area of said station, the computer station transmits on the selected carrier a basic synchronisation signal preceding a first information frame, the basic synchronisation signal occupying a particular time period longer than each information frame synchronisation field, and wherein the personalised watch is switched to a transmission mode after a particular time following the start of a first transmission of the basic synchronisation signal from the computer station in order to search for a carrier selected by the computer station from a plurality of available carriers and to lock onto said selected carrier when the watch is able to count a plurality of identical bytes of the basic synchronisation signal.

5. A method according to claim 4, wherein the heading of the information packet in the first frame transmitted by the computer station includes an identification number of the watch to be interrogated and wherein the personalised watch transmits a second information frame to the computer station only when it has recognised its identification number after locking onto the selected carrier.

6. A method according to claim 4, wherein the computer station transmits the basic synchronisation signal and the first information frame repeatedly until the personalised watch searched for responds to the computer station.

7. A method according to claim 1, wherein the heading of each of several information packets includes a code indicative of the type of information transmitted to the portable object, such as the watch, or to the computer station, the codes transmitted in each packet concerning reading data from a non-volatile memory of the watch, writing data in said memory, requesting an identification number of the watch, messages concerning reception or non-reception of the information transmitted, information on the size of the data transmitted, and information on the end of the transmission of information.

8. A method according to claim 1, wherein the computer station increases or reduces the byte size of the information in each packet as a function of a number of transmission errors counted by a transmission error counter of the computer station greater than a permitted programmed number of errors.

9. A method according to claim 4, wherein the computer station transmits a generic number in the heading of the information packet of the first information frame to enable any portable object, such as an unidentified personalised watch, in a coverage area of the computer station to respond by transmitting its personal identification number, and wherein the computer station stores an identification number of the personalised watch that has responded.

* * * * *